Sept. 17, 1968
D. SCARAMUCCI
3,401,913
BETWEEN FLANGE VALVE STRUCTURE
Filed Feb. 10, 1966
2 Sheets-Sheet 1
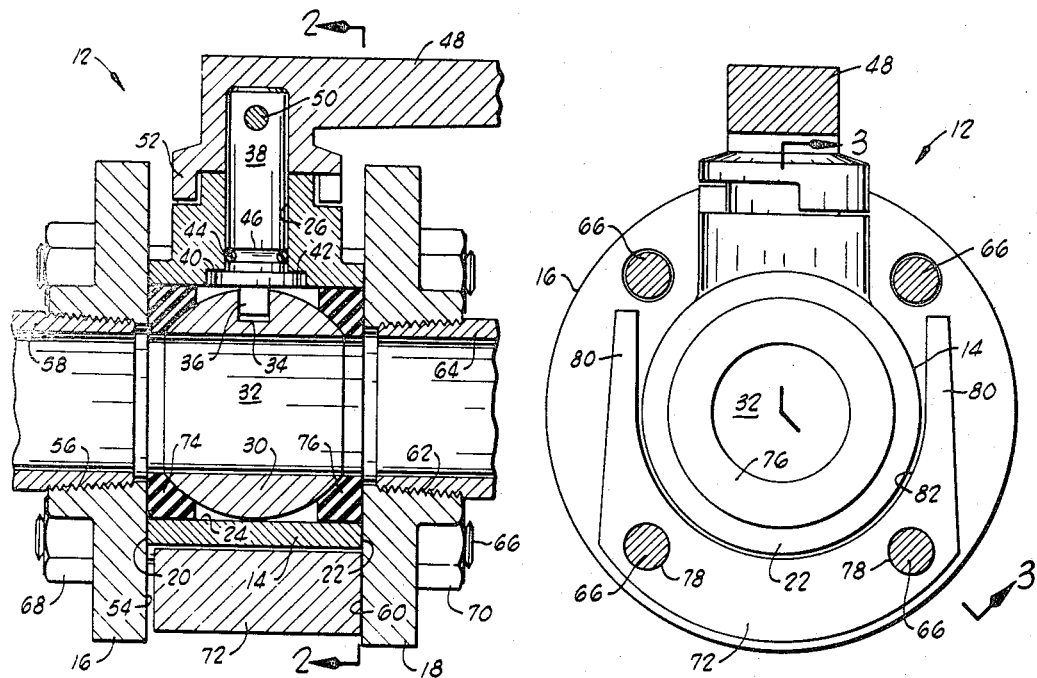
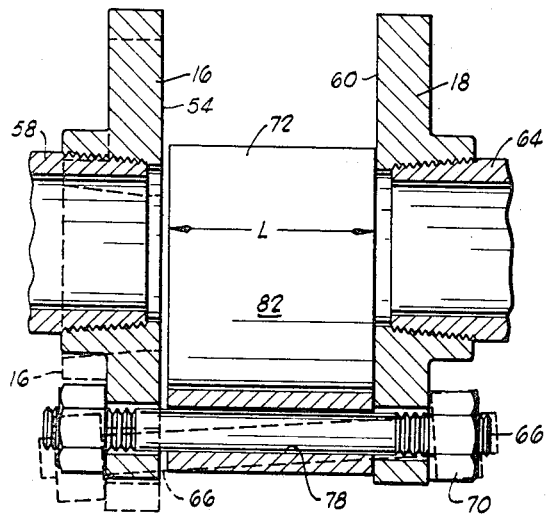
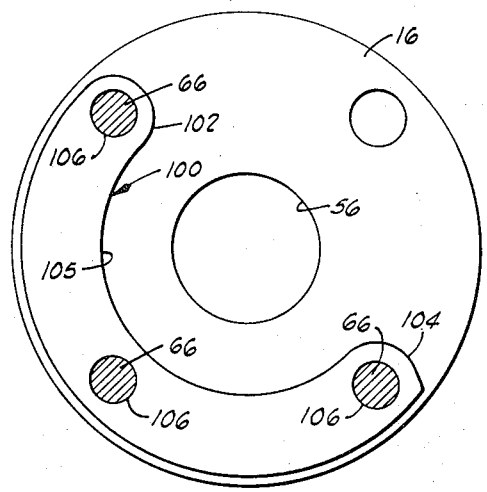
INVENTOR.
DOMER SCARAMUCCI
BY
Dunlap and Laney
ATTORNEYS

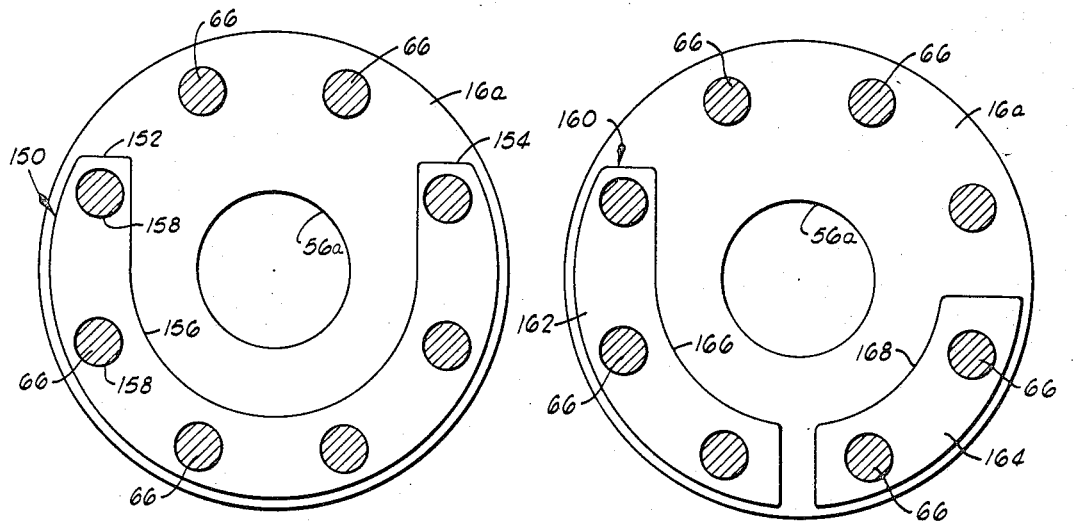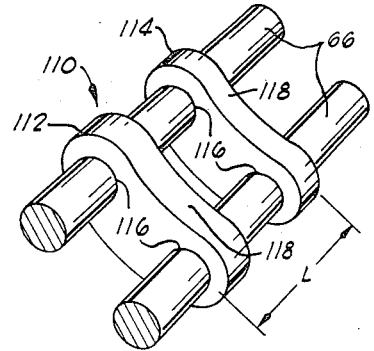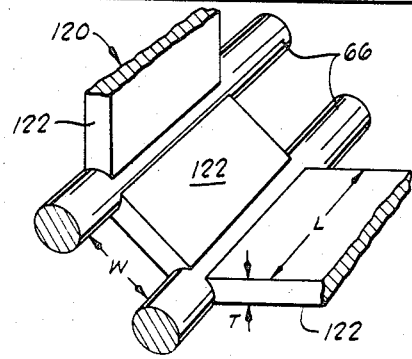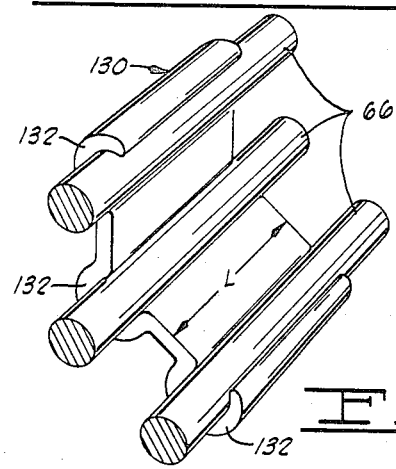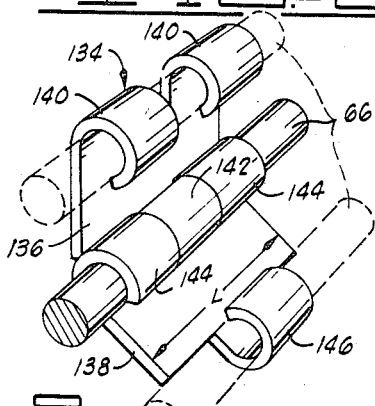

United States Patent Office 3,401,913
Patented Sept. 17, 1968

3,401,913
BETWEEN FLANGE VALVE STRUCTURE
Domer Scaramucci, Oklahoma City, Okla., assignor to Balon Corporation, Oklahoma City, Okla., a corporation of Oklahoma
Filed Feb. 10, 1966, Ser. No. 526,587
10 Claims. (Cl. 251—151)

ABSTRACT OF THE DISCLOSURE

A structure for holding the flanges of the between flange valve in alignment and not interfering with the removal of the valve from between the flanges. A support, extending around less than 180° of the valve body, engages at least two of the bolts connecting the flanges and holds the flanges aligned.

---

This invention relates generally to improved between flange valves. More particularly, but not by way of limitation, this invention relates to an improved valve structure wherein the flanged connection members on adjacent ends of pipe sections are held in alignment when the valve body is removed therefrom.

Various forms of valve structures have been constructed in the past for use between flanged connecting members that are located on adjacent ends of pipe sections. Many of these have included relatively smooth end faces on the flanged connection members and the valve body whereby the valve is positioned between the connection members by pressure exerted thereon upon tightening of threaded fasteners extending between the flanged connection members.

Frequently, the pipe sections are not in perfect axial alignment so that it is necessary to exert a force on one or both of the pipe sections to bring them into alignment. The pipe sections and the flanged connection members mounted thereon must be held in alignment while the valve body is inserted therebetween and during tightening of the threaded fasteners to retain the valve assembled. The problem of misalignment between relatively small diameter pipe sections is not too difficult to overcome since the force required to bring the pipe sections into alignment will be relatively small. However, the misalignment of even the relatvely small diameter pipe sections requires several persons in order to assemble the valve in proper alignment.

When the pipe sections are of relatively large diameter or when relatively thick wall pipe is used, such as in high pressure service applications, the force required to align the pipe sections may become very great. In many cases, the force is sufficiently great to require the use of powered equipment to bring the pipe sections into alignment so that the valve can be assembled.

When the service application in which the valve is used includes handling highly corrosive or abrasive material, the valve body must frequently be removed from the line to replace the seals or other working parts of the valve. The threaded fasteners holding the valve assembled are loosened and at least a portion of the fasteners removed in order to remove the valve body from between the flanged connection members. If the pipe sections are misaligned, loosening of the threaded fasteners permits movement relative between the flanged connection members so that they must be realigned each time the valve body is replaced in the line. Such a procedure is laborious, time-consuming and frequently expensive, particularly when the misaligning force is so great that it requires power equipment for realignment as previously mentioned.

This invention generally provides an improved valve structure that is connectable between sections of pipe or the like comprising: a pair of flanged connection members, each being arranged for connection with one end of a respective pipe section; a valve body disposed between the flange connection members; and, aligning means disposed between the flanged connection members for receiving a portion of the valve body. The aligning means includes spaced, generally parallelly extending fastener means connecting the flanged connection members to hold the valve assembled, and support means operably engaging at least two of the fastener means for preventing relative angular movement therebetween, whereby the connection members and pipe sections are held in substantial axial alignment.

An object of the invention is to provide an improved between flange valve structure that effectively retains the flanged connection members in substantial axial alignment during removal and/or insertion of the valve body therebetween.

Another object of the invention is to provide an improved between flange valve structure wherein the flanged connection members and pipe sections are held in substantial axial alignment and, yet, permits the valve body to be removed therefrom upon the removal of a minimum number of threaded fasteners.

Another object of the invention is to provide an improved between flange valve structure including means for holding the flanged connection members and pipe sections in substantial axial alignment that can be quickly, easily and economically manufactured.

The foregoing and additional objects and advantages of the invention will become more apparent as the following detailed description is read in conjunction with the accompanying drawings wherein like reference characters designate like parts in all views and wherein:

FIG. 1 is a vertical cross-sectional view of an improved between flange valve structure that is constructed in accordance with the invention;

FIG. 2 is a cross-sectional view of the valve structure of FIG. 1 taken substantially along the line 2—2 of FIG. 1;

FIG. 3 is a fragmentary cross-sectional view somewhat similar to FIG. 1, but having the valve body removed therefrom and taken substantially along the line 3—3 of FIG. 2;

FIG. 4 is a view similar to FIG. 2, but illustrating a modified form of aligning member and also having the valve body removed therefrom;

FIG. 5 is a perspective view of another embodiment of aligning assembly that is also constructed in accordance with the invention;

FIG. 6 is a perspective view of still another modification of aligning assembly also constructed in accordance with the invention;

FIG. 7 is a perspective view of still another embodiment of aligning member that is constructed in accordance with the invention;

FIG. 8 is a perspective view of an additional embodiment of aligning member also constructed in accordance with the invention;

FIG. 9 is a view similar to FIG. 7, but illustrating a modified aligning member for use between flanged connection members having a greater number of threaded fasteners; and FIG. 10 is a view similar to FIG. 9, but illustrating a modification in the arrangement of the aligning member illustrated in FIG. 9.

Embodiment of FIG. 1

Referring to the drawing and to FIG. 1 in particular, shown therein and generally designated by the reference character 12 is a ball valve constructed in accordance with the invention.

The ball valve 12 includes a valve body 14 disposed between an upstream flanged connection member 16 and a downstream flanged connection member 18. The valve body 14 includes an upstream end face 20, a downstream end face 22 and a bore 24 extending therethrough and intersecting the end faces 20 and 22. An opening 26 extends transversely through the valve body 14 intersecting the bore 24.

A valve ball 30 having a flow port 32 extending therethrough is movably positioned in the bore 24 of the valve body 14. The upper exterior surface of the valve ball 30 is provided with a rectangular recess 34 that is sized to receive a rectangular lower end 36 of a valve operating member 38.

The valve operating member 38 is disposed in the opening 26 and includes an exterior flange 40 thereon that engages a downwardly facing shoulder 42 in the valve body 14 to limit the upward movement of the valve operating member 38 relative to the valve body 14.

An O-ring seal 44 is disposed in an annular recess 46 in the valve operating member 38. The O-ring seal 44 sealingly engages the valve operating member 38 and the valve body 14 in the opening 26.

A valve operating handle 48 is attached to the upper end of the valve operating member 38 by a pin 50. The valve operating handle 48 is provided with suitably arranged lugs 52 that engage abutments (not shown) formed on the valve body 14 to limit the rotation of the handle 48 and the interconnected valve ball 30 to approximately 90 degrees.

The upstream flanged connection member 16 includes an end face 54 that is in engagement with the end face 20 on the valve body 14. A threaded opening 56 extends through the flanged connection member 16 in axial alignment with the bore 24 in the valve body 14 when the flanged connection member 16 is assembled therewith. The threaded opening 56 is arranged to receive the threaded end 58 of a section of pipe.

The downstream flange connection member 18 includes an end face 60 that is in engagement with the end face 22 on the valve body 14 and a threaded opening 62 that extends therethrough and is axially aligned with the bore 24 in the valve body 14 when the flanged connection member 18 is assembled therewith. The threaded opening 62 is arranged to receive the threaded end 64 of a second pipe section.

A plurality of threaded fasteners 66 extend through the flanged connection members 16 and 18 exteriorly of the valve body 14. Threaded nuts 68 and 70 engage the flanged connection members 16 and 18, respectively, to hold the valve 12 assembled.

As shown in cross-section in FIG. 1 and as will be described more fully hereinafter, a support or aligning member 72 is disposed between the end faces 54 and 60 on the upstream and downstream flanged connection members 16 and 18, respectively.

The valve 12 is also provided with a pair of annular seal members 74 and 76 that are disposed in the bore 24 of the valve body 14. The seal members 74 and 76 are in sealing engagement with the exterior surface of the valve ball 30. As clearly shown in FIG. 1, the upstream seal 74 is also in supporting engagement with end face 54 of the upstream flange connection member 16. Similarly, the seal member 76 is in supporting engagement with the end face 60 on the downstream flanged connection member 18. The seal members 74 and 76 are generally constructed from a resilient material which may be, if desired, reinforced by rigid supporting rings or members (not shown).

As clearly shown in FIG. 2, the support member 72 is generally U-shaped and has a pair of apertures 78 extending therethrough that are sized to receive the two lower threaded fasteners 66 that extend between the flanged connection members 16 and 18. Also as clearly shown therein, the support member 72 includes a pair of spaced leg portions 80 that extend along either side of a curved surface 82 that encompasses a portion of the valve body 14. It will be noted therein that the leg portions 80 are separated not less than the diameter of the valve body 14. Thus, it is possible to remove the valve body 14 after removing the two upper threaded fasteners 66 and loosening the two lower threaded fasteners 66 while leaving the support member 72 assembled between the flanged connection members 16 and 18.

As clearly illustrated in FIG. 3, the support member 72 has a length L that is slightly less than the distance between the end faces 54 and 60 of the flanged connection members 16 and 18, respectively, when the threaded fasteners 66 are made up to assemble the valve 12. Stated in another way, the length of the support member 72 is slightly less than a length of the valve body 14 (see FIG. 1) so that the load exerted by the threaded fasteners 66 on the flanged connection members 16 and 18 is absorbed by the engagement of the end faces 20 and 22 on the valve body with the respective end faces 54 and 60 on the flanged connection members 16 and 18 as a pure compressive load.

As can be appreciated from viewing FIG. 3, the dash line view of the flanged connection member 16 illustrates misalignment of the flanged connection members 16 and 18 in the vertical direction. It should be pointed out that the misalignment occurs only if the support member 72 is not utilized. The support member 72 closely engages the threaded fasteners 66 and, since the length L is only slightly less than the distance between the flanged connection members 16 and 18, only a very slight misalignment can occur when the threaded fasteners 66 are loosened to remove the valve body 14.

Similarly, misalignment in a lateral direction, that is, in the direction perpendicular to the vertical, cannot occur due to the engagement of the support member 72 with the two lower threaded fasteners 66 (see FIG. 2). Angular relative movement between the loosened threaded fasteners 66 is prevented thereby. Manifestly, if the support member 72 prevents relative angular movement between the threaded fasteners 66, the flanged connection members 16 and 18 and the attached pipe sections are also held against relative movement.

With the support member 72 retaining the flanged connection members 16 and 18 and the pipe sections in substantially axial alignment, the valve body 14 may be easily reinserted therebetween. Reinsertion of the two upper threaded fasteners 66 is also easily accomplished. After the upper threaded fasteners 66 are reinserted, the nuts 68 and 70 on each of the fasteners 66 are tightened to retain the valve 12 assembled. It should also be pointed out, that the curved surface 82 aids in locating the valve body 14 in the proper position, that is, in a position wherein the bore 24 is axially aligned with the openings 56 and 62, so that only one person is required to remove and reinsert the valve body 14 into position between the flanged connection members 16 and 18.

*Modification of FIG. 4*

FIG. 4 illustrates a modified form of support member that is generally designated by the reference character 100 and is also constructed in accordance with the invention. As shown therein, the support member 100 comprises a U-shaped member having a pair of leg portions 102 and 104. The leg portions 102 and 104 are separated by a distance that is at least equal to the diameter of a valve body (not shown) that will be inserted therein.

As illustrated, the support member 100 is provided with three apertures 106 that are sized to receive three of the threaded fasteners 66 extending between the flanged connection members 16 and 18. The fasteners 66 are provided to assemble the valve as previously described in connection with FIG. 1.

It will be understood by those skilled in the art that the support member 100 has a length (not shown) that is equal to the length L previously described and shown in FIG. 3. It will also be apparent that the support member 100 provides a greater degree of resistance against relative movement between the flanged connection members 16 and 18 since it engages three of the threaded fasteners 66 instead of only two as described in connection with the support member 72.

While the support member 100 is somewhat heavier than the support member 72, it provides the advantage of more rigidly holding the flanged connection members 16 and 18 in alignment while permitting the removal and insertion of the valve body (not shown) by removing only one threaded fastener 66 and loosening the other three. Since the support member 100 is provided with an inner curved surface 105, it will also be apparent that the support member serves as a guide for properly locating the valve body (not shown) in alignment with the openings 56 and 62 in the flanged connection members 16 and 18.

*Modification of FIG. 5*

The perspective view of FIG. 5 illustrates a support or aligning assembly that is generally designated by the reference character 110. As illustrated, the support assembly 110 includes two separate but identical support members 112 and 114 that are axially aligned on a pair of the threaded fasteners 66. Each of the members 112 and 114 includes a pair of apertures 116 that are sized to closely engage the threaded fasteners 66. Each of the members 112 and 114 also includes a curved inner surface 118 that is arranged to aid in locating the valve body (not shown) in proper alignment when the valve is assembled.

It will be noted in FIG. 5 that the support members 112 and 114 are arranged on the threaded fasteners 66 to have an overall length L that is equal to the length L previously described in connection with FIG. 3. Thus, the support assembly 110 is somewhat lighter than the support members 72 and 100 previously described, but is effective to provide alignment of the flanged connection members 16 and 18 as previously described in connection with the embodiment of FIG. 1.

*Modification of FIG. 6*

The perspective view of FIG. 6 illustrates the construction of another support assembly generally designated by the reference character 120. As shown therein, the support assembly 120 includes a plurality of support members 122 disposed between and suitably attached to the threaded fasteners 66. Each of the members 122 has a length L that is the same as the length L previously described in connection with FIGS. 3 and 5. Also, each of the members 122 has a width W that is equal to the spacing between the threaded fasteners 66.

Since the members 122 are attached to the threaded fasteners 66, no relative movement can occur between the threaded fasteners 66 and thus the support member 120 maintains the flanged connection members 16 and 18 in very close alignment even though the nuts (not shown) on fasteners 66 may be loosened for the purpose of removing the valve body (not shown) from the assembly.

If desired, the support members 122 may have a thickness T that is sufficient to afford a means of guiding the valve body (not shown) into proper location in the assembly whereby the bore extending through the valve body will be in alignment with the interior of the pipe sections. It should also be pointed out that the number of support members 122 used depends upon the size and spacing of the threaded fasteners 66. However, the support assembly 120 should not encompass more than 180 degrees of the valve body so that the valve body can be removed therefrom without removing the support assembly 120.

*Modification of FIG. 7*

The perspective view of FIG. 7 illustrates the structure and arrangement of a support or aligning member 130 that may be applied to the threaded fasteners 66 to maintain the flanged connection members 16 and 18 (not shown) in axial alignment.

As shown therein, the support member 130 is constructed from a single piece having a length L as previously described. The support member 130 includes a plurality of spaced, curved portions 132 that encircle a portion of each of the threaded fasteners 66. The arrangement is such that the curved portions 132 engage and interconnect the spaced, threaded fasteners 66 to prevent relative angular movement therebetween. Thus, the support member 130 serves to retain the flanged connection members 16 and 18 in axial alignment even though the valve body (not shown) is removed from between the flanged connection members.

The particular structure illustrated for the support member 130 is suitably arranged to be constructed by stamping or forging. Naturally, the heavier or the thicker the material used in forming the support member 130 and the greater the degree of encirclement on the curved portions 132 on the individual threaded fasteners 66, the greater will be the ability of the support member 132 to retain the flanged connection members 16 and 18 in axial alignment.

*Modification of FIG. 8*

The perspective view of FIG. 8 illustrates another modification of support assembly that is generally designated by the reference character 134. As shown therein, the support assembly 134 includes a pair of identical members 136 and 138 each of which has an overall length L as previously described.

As clearly shown in FIG. 8, the member 136 includes an edge portion having a pair of spaced arcuate portions 140 that encircle one of the threaded fasteners 66 (shown in dash lines). On the other edge portion of the member 136, a single arcuate portion 42 is formed that encircles a portion of a second threaded fastener 66.

The member 138 includes an edge portion having a pair of spaced arcuate portions 144 thereon that are disposed on either side of the arcuate portion 142 of the support member 136. The arcuate portions 144 encircle the second threaded fastener 66. The other edge portion of the support member 138 is provided with a single arcuate portion 146 that is identical to the arcuate portion 142 on the support member 136. The arcuate portion 146 encircles a third threaded fastener 66.

Manifestly, as many of the identical support members 136 and 138 may be used as desired to provide the needed force to prevent relative angular movement between the threaded fastener 66, thereby maintaining the flanged connection members 16 and 18 (not shown) in axial alignment. As can be appreciated by one skilled in the art, the arrangement of the support members 136 and 138 may be very suitably manufactured by stamping or forging.

It is anticipated that the support member 130 (see FIG. 7) and the support assembly 134 of FIG. 8 may be very economically produced and, yet, will provide sufficient support to maintain the flanged connection members in axial alignment. As previously mentioned, as many of the support members 136 and 138 may be used to provide the force required, but the number used should not encircle more than 180 degrees of the valve body (not shown), so that the valve body can be removed from between the flanged connection members 16 and 18 without removing the support assembly 134.

*Modification of FIG. 9*

FIG. 9 illustrates a modified form of the support or aligning member that is generally designated by the reference character 150 and is also constructed in accordance with the invention. As shown clearly in FIG. 9, the support member 150 is constructed to be utilized with a flanged connection member 16a. It will be understood that a mating flanged connection member (not shown) will be connected therewith as illustrated in FIGS. 1 through 3. The significant difference between the flanged connection members 16 and 16a is that the flanged connecting member 16a is generally utilized with larger pipe sizes and includes a larger number of threaded fasteners 66.

The support member 150 is generally U-shaped in configuration having a pair of leg portions 152 and 154. Although a valve body is not shown in FIG. 9, it will be understood that the space between the leg portions 152 and 154 will be adequate to permit the insertion and removal of the valve body therebetween. The support member 150 also includes a curved or arcuate inner surface 156 that is arranged to receive the valve body (not shown) to aid in axially aligning the bore extending through the valve body with the opening 56a in the flanged connection member 16a.

A plurality of spaced openings 158 extend through the support member 150. The openings 158 are sized to closely receive a plurality of the threaded fasteners 66. It will also be understood that the support member 150 has a length L (not shown) as previously described in connection with FIG. 3.

From viewing FIG. 9, it can be readily perceived that the valve body (not shown) can be easily removed from between the flanged connecting members by simply removing the two upper threaded fasteners 66. It should be pointed out that the large number of threaded fasteners 66 encompassed by the support member 150 provides an assembly that is effective to retain the flanged connection members in axial alignment even though the valve body is removed therefrom.

*Modification of FIG. 10*

FIG. 10 illustrates a modification of support assembly generally designated by the reference character 160 that includes a pair of support members 162 and 164. As can be appreciated from viewing FIG. 10, the support assembly 160 provides substantially the same support as the support member 150, but will weigh somewhat less due to the provision of the two separate members 162 and 164 and the shortening of the member 164.

The support member 162 includes a curved inner surface 166 and the support member 164 includes a curved inner surface 168. Combined, the curved surfaces 166 and 168 function to aid in aligning the valve body (not shown) when it is inserted between the flanged connection members. As was true in the support member 150, it is necessary to remove only the two upper threaded fasteners 66 to permit removal and insertion of the valve body between the flanged connection members.

It should also be pointed out that the various configurations of support members and assemblies previously described may each be utilized in connection with either embodiment of flanged connection member 16 or 16a previously described. Also, each of the support members and support assemblies previously described provide means for maintaining the flanged connection members and the attached pipe sections in substantial axial alignment while permitting removal and insertion of the valve body upon removal of the minimum number of threaded fasteners. Furthermore, each of the support members and assemblies may be easily, economically and quickly constructed and installed without undue difficulty between the flanged connection members during the initial installation of the valve. As will be readily perceived from the foregoing description, the removal and insertion of the valve body between the flanged connection members can be easily accomplished by one man when the valves are provided with support members or assemblies constructed in accordance with the invention.

It will be understood that the embodiments described hereinbefore are presented by way of example only and that many changes and modifications can be made thereto without departing from the spirit of the invention or from the scope of the annexed claims.

What I claim is:
1. A valve structure connectable between sections of pipe or the like comprising:
   a pair of flanged connection members, each being arranged for connection with one end of a respective pipe section;
   a valve body disposed between said flanged connection members; and
      aligning means disposed between said flanged connection members for receiving a portion of said valve body, said aligning means including spaced, generally parallelly extending fastener means connecting said flanged connection members to hold said valve structure assembled, and
      support means spanning the distance between and engaging at least two of said fastener means for preventing relative angular movement therebetween, whereby said connection members and pipe sections are held in alignment.
2. The valve structure of claim 1 wherein said support means includes an inner surface arranged to receive said valve body, said inner surface being disposed adjacent not more than 180° of said valve body whereby said valve body can be removed therefrom without removing said support means from engagement with said fastener means.
3. The valve structure of claim 1 wherein said support means comprises a generally U-shaped member having a pair of spaced leg portions, the ends of said leg portions being spaced at least the width of said valve body, whereby said valve body can be removed from between said flanged connection members without removing said support means from engagement with said fastener means.
4. The valve structure of claim 3 wherein said support means operably engages at least three of said fastener means.
5. The valve structure of claim 1 wherein said support means includes a pair of arcuate support members, each said support members operably engaging at least two of said fastener means.
6. The valve structure of claim 5 wherein said support members operably engage the same fastener means.
7. The valve structure of claim 5 wherein said support members operably engage different fastener means.
8. The valve structure of claim 5 wherein said support members operably engage one common fastener means and each operably engages at least one uncommon means.
9. The valve structure of claim 8 wherein each support member includes: a body having a first and a second edge, said first edge havig a pair of spaced arcuate portions arranged to encircle one of said fastener means, and said second edge having a single arcuate portion arranged to encircle one of said fastener means, said single arcuate portion on one of said support members is disposed between the spaced arcuate portions on the other said support member in operable engagement with said common fastener means.
10. The valve structure of claim 1 wherein said support means includes at least one support member disposed between and rigidly attached to at least two of said fastener means.

References Cited

UNITED STATES PATENTS 3,072,139  1/1963  Mosites _____ 251—317 X
3,157,380  11/1964 Sivyer _____ 251—315 X

FOREIGN PATENTS 1,411,205  9/1965  France.

M. CARY NELSON, *Primary Examiner.*

M. O. STURM, *Assistant Examiner.*